(12) United States Patent
Thompson

(10) Patent No.: US 8,802,906 B2
(45) Date of Patent: Aug. 12, 2014

(54) METHOD OF RECOVERING ENERGY

(76) Inventor: David Brent Thompson, Idaho Falls, ID (US)

( * ) Notice: Subject to any disclaimer, the term of this patent is extended or adjusted under 35 U.S.C. 154(b) by 664 days.

(21) Appl. No.: 13/084,277

(22) Filed: Apr. 11, 2011

(65) Prior Publication Data

US 2011/0186415 A1  Aug. 4, 2011

Related U.S. Application Data

(62) Division of application No. 11/761,974, filed on Jun. 12, 2007, now Pat. No. 7,951,271.

(60) Provisional application No. 60/804,508, filed on Jun. 12, 2006.

(51) Int. Cl.
C07C 1/00 (2006.01)
C10B 45/02 (2006.01)

(52) U.S. Cl.
USPC ............ 585/241; 201/5; 201/25; 201/29; 201/30

(58) Field of Classification Search
CPC ......... C10B 47/28; C10B 47/32; C10G 1/10; C10G 2300/10
USPC ............... 585/241; 201/5, 25, 29, 30
See application file for complete search history.

(56) References Cited

U.S. PATENT DOCUMENTS

| | | | |
|---|---|---|---|
| 3,631,923 A | 1/1972 | Izeki | |
| 4,182,410 A | 1/1980 | Yoshida | |
| 4,284,616 A | 8/1981 | Solbakken | |
| 4,384,151 A | 5/1983 | Audibert | |
| 4,507,174 A | 3/1985 | Kutrieb | |
| 4,588,477 A | 5/1986 | Habib | |
| 4,648,328 A | 3/1987 | Keough | |
| 4,740,270 A | 4/1988 | Roy | |
| 4,846,082 A | 7/1989 | Marangoni | |
| 4,936,954 A | 6/1990 | Sander | |
| 4,983,278 A * | 1/1991 | Cha et al. ................ 208/407 |
| 5,057,189 A | 10/1991 | Apffel | |
| 5,070,109 A | 12/1991 | Ulick | |
| 5,087,436 A | 2/1992 | Roy | |
| 5,229,099 A | 7/1993 | Roy | |
| 5,389,691 A | 2/1995 | Cha | |
| 5,452,670 A | 9/1995 | Towne | |
| 5,470,384 A | 11/1995 | Cha | |
| 5,618,852 A | 4/1997 | Adkins | |
| 5,735,948 A | 4/1998 | Cha | |
| 5,783,046 A | 7/1998 | Flanigan | |
| 5,905,095 A | 5/1999 | Adkins | |
| 5,936,134 A | 8/1999 | Mastral Lamarca | |

(Continued)

FOREIGN PATENT DOCUMENTS

EP  1347238  9/2003
GB  2303859  3/1997

Primary Examiner — Nina Bhat
(74) Attorney, Agent, or Firm — Robert L. Shaver; Dykas & Shaver, LLP

(57) ABSTRACT

Described is an apparatus and method for recovery of energy and by-products from automobile and truck tires. The tires are heated in an oxygen poor environment, and the off gases are condensed to recover a liquid oil product and compressible natural gas. The tires are reduces to ash and steel, both of which can be feed streams for other processes. The apparatus includes a condenser with cooled plates, and oil recovery structures.

4 Claims, 6 Drawing Sheets

(56) References Cited

U.S. PATENT DOCUMENTS

| | | | |
|---|---|---|---|
| 6,657,095 B1 * | 12/2003 | Holden et al. | 585/241 |
| 7,101,463 B1 | 9/2006 | Weinecke | |
| 7,329,329 B2 * | 2/2008 | Masemore et al. | 202/117 |
| 2003/0109761 A1 * | 6/2003 | Suominen | 585/241 |
| 2005/0023124 A1 * | 2/2005 | Karpetsky et al. | 201/25 |
| 2005/0166812 A1 | 8/2005 | Noll | |
| 2006/0211899 A1 * | 9/2006 | Lee | 585/241 |
| 2009/0211892 A1 * | 8/2009 | Cunningham et al. | 201/25 |

* cited by examiner

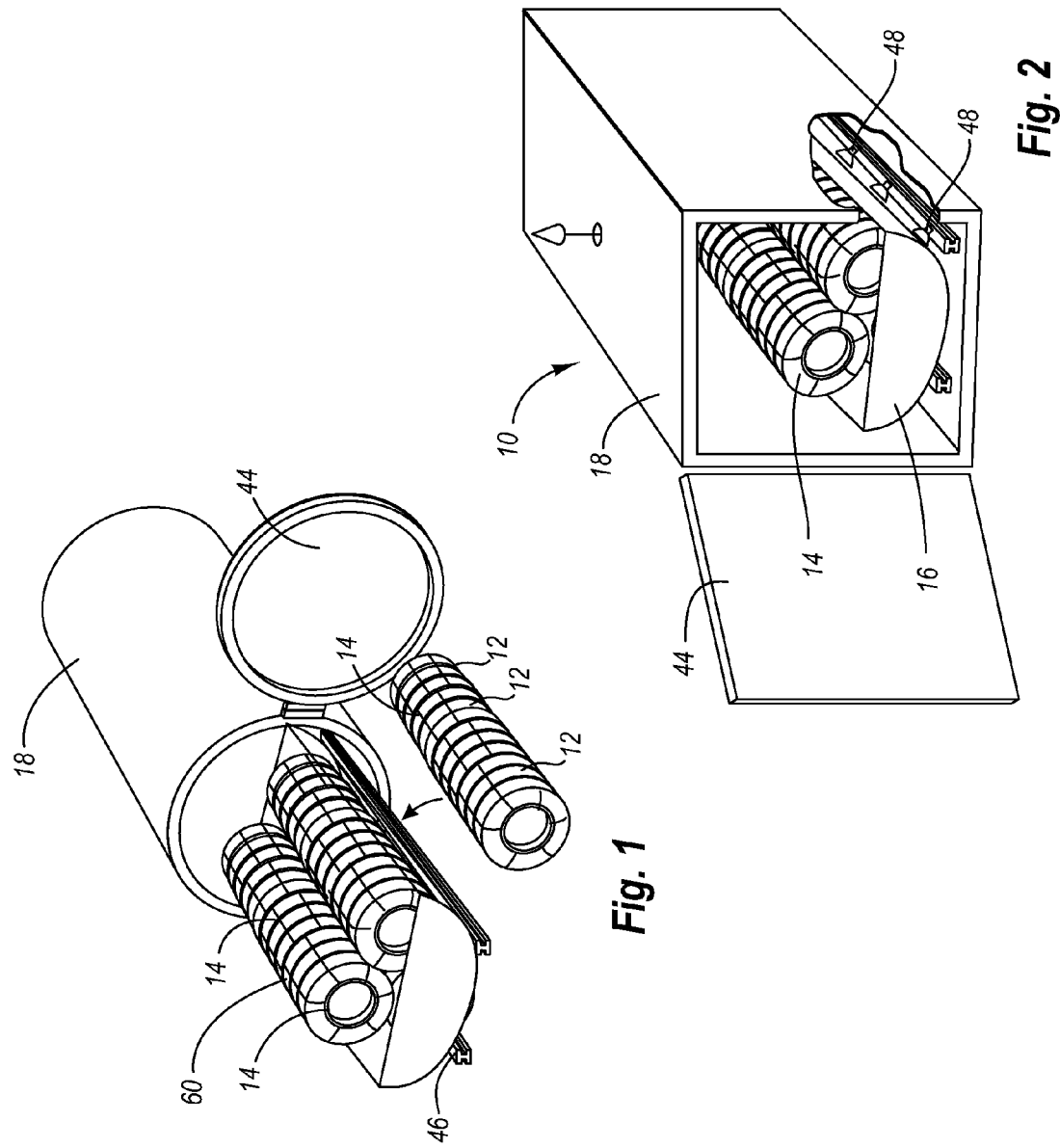

METHOD OF RECOVERING ENERGY

CROSS-REFERENCE TO RELATED APPLICATIONS

This application is a Divisional application and claims the priority date of the utility application entitled SYSTEM FOR RECOVERING OIL FROM USED AUTOMOBILE TIRES filed by David Brent Thompson on Jun. 12, 2007, with Ser. No. 11/761,974, now U.S. Pat. No. 7,951,271 which claims the priority date of the provisional application entitled SYSTEM, METHOD AND PROCESS OF RECOVERING OIL FROM USED AUTOMOBILE TIRES filed by David Brent Thompson on Jun. 12, 2006 with application Ser. No. 60/804,508.

FIELD OF THE INVENTION

The present invention generally relates to an apparatus, system and method for recovering energy from automobile tires, and more particularly to an apparatus, system, and method for using pyrolysis for recovering oil and gas from automobile tires, leaving only carbon ash and steel.

BACKGROUND OF THE INVENTION

There are millions of cars and trucks on the roads, with millions of vehicles added each year. This results in tens of millions of tires being used and discarded each year. Disposing of these tires has proven problematic. With space in landfills becoming more and more scarce, it is not economical to dispose of automobile tires in landfills. Dumping tires in the ocean has not proven to be ecologically sound as the sea life does not adhere to the tire surfaces and ocean currents can cause the tires to be dispersed. When tires come into contact with natural ecosystems, they harm the ecosystems by physically breaking off coral and covering ocean invertebrates. They also release a steady stream of contaminants into the water which kills surrounding ocean life.

Burning tires also involves huge environmental issues because the burning tires release a huge amount of particulate matter, smoke and unburned hydrocarbons into the air.

Various methods have been devised to deal with used tires, including large machines which break them into small pieces. The presence of steel within the tires makes chipping them into small pieces difficult, and previous attempts to recover oil or energy from the tires has not resulted in a clean and efficient system.

What is needed is a tire processing system which recovers oil and gas from the tires and makes those available as energy sources or as feedstock to other manufacturing processes. A further goal is to reduce the bulk of the tires so that only ash and steel remain from the original tires, with both of these being able to be fed into an industrial process as a feedstock.

SUMMARY OF THE INVENTION

These and other objects are accomplished by the apparatus, method and process of the invention. The present invention is an apparatus, method and process for processing whole automobiles tires into gaseous, liquid, and solid products streams in a pyrolysis process with no waste products being left.

One example embodiment of the present invention is an energy recovery system which uses automobile tires for fuel. The system uses a heating process for vaporizing all but the steel and carbon of the tire, and producing an oil and natural gas product. The method uses a vessel in which tires are heated. They are heated to 500-1,300° F. in a low oxygen environment and the components in the tires are heated to the point of vaporization. The vapors are sent to another vessel where condensation takes place and an oil product containing naphthas, diesel fuel, gasoline and other hydrocarbon chemicals are condensed from the tire vapors. The remaining gaseous tire vapors constitute natural gas that is collected and stored. Both the oil product and the natural gas product are useable as a feedstock or as a fuel, and the carbon and steel left from the tires are also useable feedstocks for other processes.

The method and process will be described first and starts with the step of providing the supply of automobile tires. This is not difficult to attain, because the supply of automobile or vehicle tires is very large at present.

The next step is to align a quantity of the tires so that the tires are stacked sidewall to sidewall in a generally cylindrical shape, with the central opening of each tire adjacent to the central opening of adjacent tires, so that the cylinder has an opening extending along its entire length.

The next step involves banding the tires in the cylinder together, using metal straps or metal wires, or some other incombustible material, to form a bundle of axially aligned tires.

The next step is placing one or more of these bundles in a receptacle. The receptacle could also be called a car, a tray, a cart, and is basically a mobile container which holds the tires during the heating process. The receptacle would typically include wheels and the wheels would be configured to operate on a rail system.

The next step is to place one or more of the receptacles described above into a pyrolysis chamber. The pyrolysis chamber has a door which may be opened and closed to withdraw a cooked receptacle and to admit a new receptacle loaded with bundles of automobile tires. The receptacle door seals to the body of the pyrolysis chamber with an air tight seal. Once one or more receptacles are in the pyrolysis chamber, the next step would be sealing the pyrolysis chamber by securing the door to the chamber body. The next step is heating the pyrolysis chamber, which also involves heating the one or more receptacles that are inside the pyrolysis chamber and the one or more bundles of tires which are inside each receptacle.

As the bundles are heated, gaseous emissions or vapors are produced and these exit the pyrolysis chamber by a ventilation system. In the process of ventilating the pyrolysis chamber, the existing oxygen in the pyrolysis chamber is either used up or flushed out of the chamber, so that the pyrolysis chamber becomes a low oxygen environment. In the low oxygen environment of the pyrolysis chamber, the bundles of tires may reach a temperature at which they would combust, but since no oxygen is present, they cannot combust. Instead, the bundles of tires will continue to off-gas until all that is left in the tires is carbon ash and the steel that was in the tires. A particularly desirable byproduct of the process is a carbon ash which has about two percent by weight of oil in the ash. This carbon ash with the small amount of oil is desirable as a feedstock for other industries such as the steel industry.

The next step is ventilating the gaseous vapor from the pyrolysis chamber into a condensation system through the use of a ventilation system. The condensation system includes a condenser, in which are placed a number of condenser plates. The condensation plates can be generally horizontal in placement, and each condensation plate partially obstructs the escape route of gaseous emissions from the pyrolysis chamber. The condenser plates are water cooled, and each condenser plate partially blocks the escape route of the gaseous emissions from the pyrolysis chamber.

In one configuration, the condensation plates are placed on an array of tubes through which water flow.

In one embodiment of the method of the invention, the condensation plates are set at an angle. Being set at an angle, as hydrocarbons condense from the gaseous vapors, oil condenses on the condenser plates and flows downhill on the condensation plates. A route for condensed oil is provided, with condensed oil flowing down the condenser plates and into a condensation tube.

The gaseous vapors or emissions from the pyrolysis chamber flow past the condenser plates, and eventually exit the condenser. The condenser accomplishes the step of condensing oil from the vapor in the condensation system. The condenser also accomplishes the step of collecting oil, as the oil exits the condenser through the condenser tube.

The next step in the process is capturing, compressing and storing the vapor which exits the condenser itself. This gas has much of its hydrocarbon content removed, but still retains enough hydrocarbons that it is combustible. This vapor exits the condenser and is collected, compressed and stored as natural gas.

Another step in the process can be cooling the pyrolysis chamber after the heating step. Preferably, the bundle of tires is cooled to below about 150° Fahrenheit. This is performed so that when the door is opened and oxygen is reintroduced into the chamber, the bundle of tires does not reignite any residual oil contained in the tires.

The next step is removing the charred remnants of the bundle from the receptacle. From the charred remnants in the receptacle steel can be removed for recycling as scrap metal, and the ash residue of the tires can be collected and sold as a feedstock for various industries. The steel is easily recovered from the mass of ash by the use of magnetism, or by use of coarse filters; these techniques are well known in the industry.

Before starting the pyrolysis process, one embodiment of the invention involves compressing the bundle and tying the bundle together in its compressed state through the use of at least one metal fastener, which would typically be a wire or metal strap or banding.

The heating step of the method is preferably carried out so that the bundle of tires reaches a temperature of 500-1300° Fahrenheit. (260-704° Centigrade.).

The invention also pertains to an energy recovering device or system, with the purpose of recovering oil and energy from vehicle tires. In the process of doing this, oil and natural gas are recovered, and the tires are reduced to ash and steel. The device includes one or more receptacles for holding vehicle tires. These receptacles are configured for insertion into a pyrolysis chamber. The receptacles can take a number of forms, with one being an open-topped cart which is a section of a cylinder, in which bundles of tires are placed. Typically, the receptacle would include wheels and tracks on which the wheels run. The receptacles are placed in a pyrolysis chamber. The pyrolysis chamber is sized depending on how many receptacles it is made to enclose. In one embodiment, the pyrolysis chamber encloses one receptacle and need not be much larger than the outer dimensions of the receptacle. The pyrolysis chamber includes a door which opens to admit or withdraw a receptacle, and which closes to form an airtight seal so that no air enters the pyrolysis chamber during the heating phase. The system also includes a heat source for heating the pyrolysis chamber and its contents.

The device or system includes a ventilation system, which comprises a condenser with one or more water cool condensation plates and a condenser tube and a gas recovery system. The condenser typically contains a plurality of condenser plates which are in contact with water cooled tubes. The water cooled tubes may be round in cross section and connected at one end to a first header and at another end to a second header. Water flows through the tubes from one header to the other and the fluid in the tubes absorbs heat and carries it away. A sheet or plate is in contact with the water cooled tubes, and is preferably welded into contact with the tubes. The tubes can be round tubes with water flowing through them, or the whole condenser plate can form a single tube with a hollow center through which water can flow. The condenser plates are placed generally horizontally in the condenser to promote condensation running down the plates and collecting the oil at the bottom of the condenser by gravity. For this reason, the condenser plates are preferably set at an angle from the horizontal, and each condenser plate partially blocks the escape route of gaseous emissions from the pyrolysis chamber. By partially blocking the escape route of gasses, the gasses can be forced to follow a circuitous path through the condenser, and thus increase the condenser plate surface area that the gasses come in contact with. The gasses would typically be forced to the extreme left, then the extreme right, then the extreme left of the condenser, and would pass over an increased surface area of condenser plates by this means of routing.

Attached to the bottom of the water cool tubes are a plurality of protrusions, which extend downward from the condenser plates and/or the pipes or tubes. The condenser plates provide a surface for condensed oil to drip off of one condenser plate onto the condenser plate below. On the top surface of the condenser plate the oil drains to the downhill side of the condenser plate and is routed to a condenser tube by which the oil is collected and exits the condenser.

The gas stream which exits the condenser still contains hydrocarbons, and this gas is captured and compressed and may be utilized as an energy source. One use of this gas is to provide heat to the pyrolysis chamber for the processing of more bundles of tire.

The purpose of the foregoing Abstract is to enable the public, and especially the scientists, engineers, and practitioners in the art who are not familiar with patent or legal terms or phraseology, to determine quickly from a cursory inspection, the nature and essence of the technical disclosure of the application. The Abstract is neither intended to define the invention of the application, which is measured by the claims, nor is it intended to be limiting as to the scope of the invention in any way.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

BRIEF DESCRIPTION OF THE DRAWINGS

FIG. 1 is a perspective view of the receptacle being loaded into a cylindrical pyrolysis chamber.

FIG. 2 is a perspective view of the receptacle loaded into a rectangular pyrolysis chamber.

DESCRIPTION OF THE PREFERRED EMBODIMENTS

Figure 4:
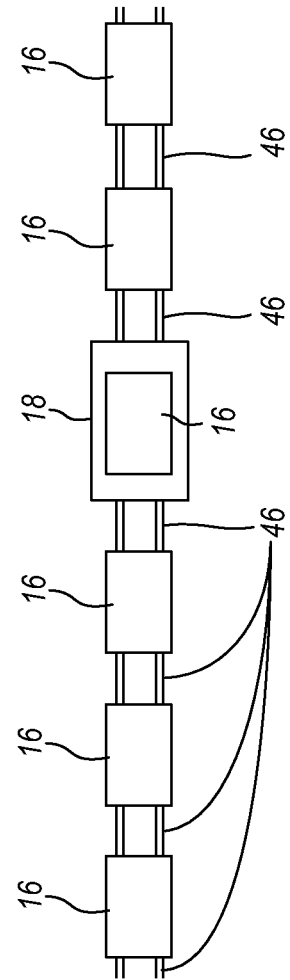
FIG. 4 is a diagrammatic view of a sequence of receptacles being processed through a pyrolysis chamber.
Figure 3:
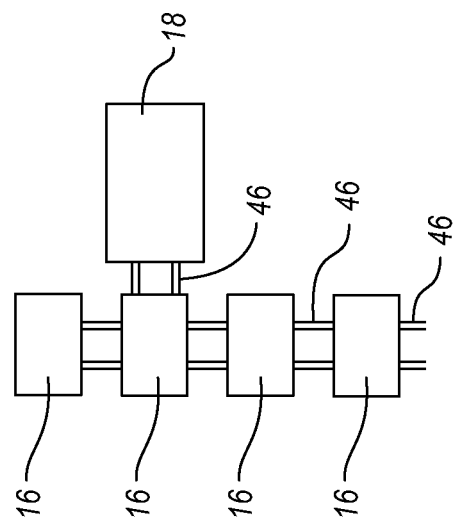
FIG. 3 is a diagrammatic view of receptacles assembled for sequential processing through a pyrolysis chamber.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In the following description and in the figures, like elements are identified with like reference numerals. The use of "or" indicates a non-exclusive alternative without limitation unless otherwise noted. The use of "including" means "including, but not limited to," unless otherwise noted.

Referring to FIGS. 1-2, a second embodiment of the present invention is shown, being a system, method and/or process 10 (hereinafter "method") starting with a supply of used automobile tires as a fuel source. These automobile tires 12 are aligned together so that their center (wheel hub hole) passageways align, thereby forming a generally cylindrical shaped structure (bundle) 14 comprised of tires. This cylindrical structure 14 is held together, preferably through use of a plurality of wires or metal straps. Optionally, the cylinders of tires could be first compressed axially before the wires are applied. By compressing the tire cylinders, heat will be distributed better. It has been found that whole tires are preferred over shredded tires because less heat transfer is obtained if the tires are first shredded. However, baled, chopped and/or shredded tires (or any other source of high durometer/vulcanized rubber) may be used, with modifications made to the system suitable for each form of rubber.

The method provides a sealed pyrolysis chamber 18 for holding at least one, and preferably a plurality, of these cylindrical tire bundles/structures 14 therein. The pyrolysis chamber 18 has a door 44 configured for opening and thereby permitting cylindrical structures 14 to be inserted into the pyrolysis chamber 18. Once the desired quantity of cylindrical structures 14 has been inserted into the chamber 18, the door is closed and the pyrolysis chamber 18 is sealed. Preferably the chamber 18 is not a pressure vessel or vacuum chamber. It is preferred that this door have a water-cooled seal therein, to facilitate rapid cycling of the contents, and safe opening of the door. Heat is preferably applied to the outside of the pyrolysis chamber.

Heating byproducts are allowed to exit the chamber 18 by passive airflow through use of a ventilation system 20. However no fresh airflow is permitted to enter the chamber 18. In such an arrangement, as the chamber is heated, oxygen is quickly pushed out of the chamber 18 and into the ventilation system 20. Because the tires are heated in the absence of a source of oxygen (no new airflow (oxygen) is introduced into the chamber), the tires do not melt but instead are charred, releasing a vapor product.

In one preferred embodiment, the pyrolysis chamber further comprises a receptacle 16 into which the cylindrical structures are stacked. The preferred receptacle comprises a removable structure, such as a wheeled basin or tray, which can be wheeled into and out of the pyrolysis chamber.

There are a number of different ways to load/unload the chamber. In a first embodiment the wheeled basin 16 rides on one or more rails 46 into and out of the chamber 18, the basin 16 wheeled into the chamber and heated, and then wheeled out of the chamber 18 after cooling or to allow cooling outside the chamber 18. In a second embodiment, the present invention comprises a rotating turntable of wheeled basins on rails allowing a basin to be wheeled in, heated, wheeled out and rotated to the next position to allow cooling while the next basin in sequence is inserted into the chamber. Other types of continuous feed arrangements could be likewise utilized. Further, providing a separate chamber for the cool down step would be another option, so that the pyrolysis chamber would not have to cool down.

The wheeled basin 16 is configured for supporting one or more of the cylindrical tires structures. Preferably a plurality of the cylindrical structures could be stacked within the wheeled basin 16.

In use, the receptacle would be wheeled into the pyrolysis chamber and the door 44 to the pyrolysis chamber would be closed. The chamber 18 would then be heated by a heat source 48, which is located outside the pyrolysis chamber, until the external temperature reaches ~800-1300° F. (427-704° C.), preferably 900° F. (482° C.), resulting in an internal temperature of 500-1300° F. (260-704° C.). The preferred source of heat is via one or more natural gas burners. Natural gas burners are the preferred heat source because of the wide range of BTU values and consistent heat output. Natural gas from processing tires can be used for this purpose.

When the desired temperature is reached, the heat source 48 is turned off and the cylindrical structures 14 would be allowed to cool down until they are ~150° F. (66° C.). At greater than 150° F., the tires may re-ignite due to hot spots in the tires.

Through this method, the mass of the tires is substantially converted into vapors or gaseous byproducts which are vented to the ventilation system 20, which includes a condensation system 22. What is left behind in the chamber 18 a mass which is 90-92% pure carbon, plus whatever steel belts existed in the tires and ~5% ash and ~2% volatile organic carbon.

In one example implementation of the present invention, 100 lbs of tires becomes up to 50 lbs of oil, 35 lbs of carbon, 10-15 lbs of steel and 0-5 lbs of natural gas. There is no waste to be transferred to a landfill in such an implementation, as the steel is recycled and the ash is a useful product. The BTU value of the natural gas is 1280 wet and 1303 dry, and the natural gas contains ethane, propane and butane.

The oil recovered is composed of light and heavy naphthas, diesel fuel and other chemicals. This mix is roughly equivalent to #6 cutting oil, and can be used as a supplement to #6 cutting oil, crude diesel and kerosene.

Figure 5:
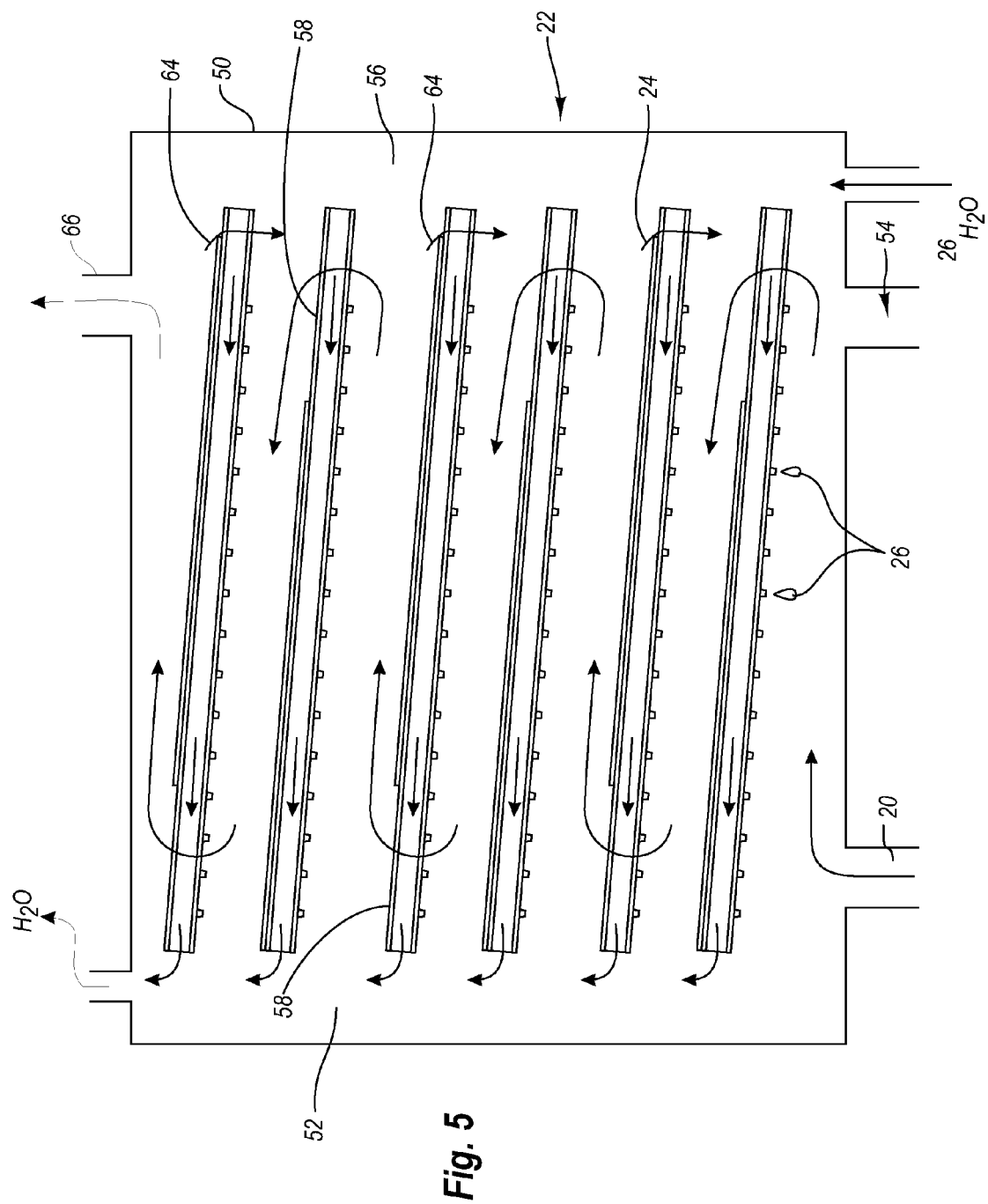
FIG. 5 is a side cutaway view of the condenser of the invention.
Figure 6:
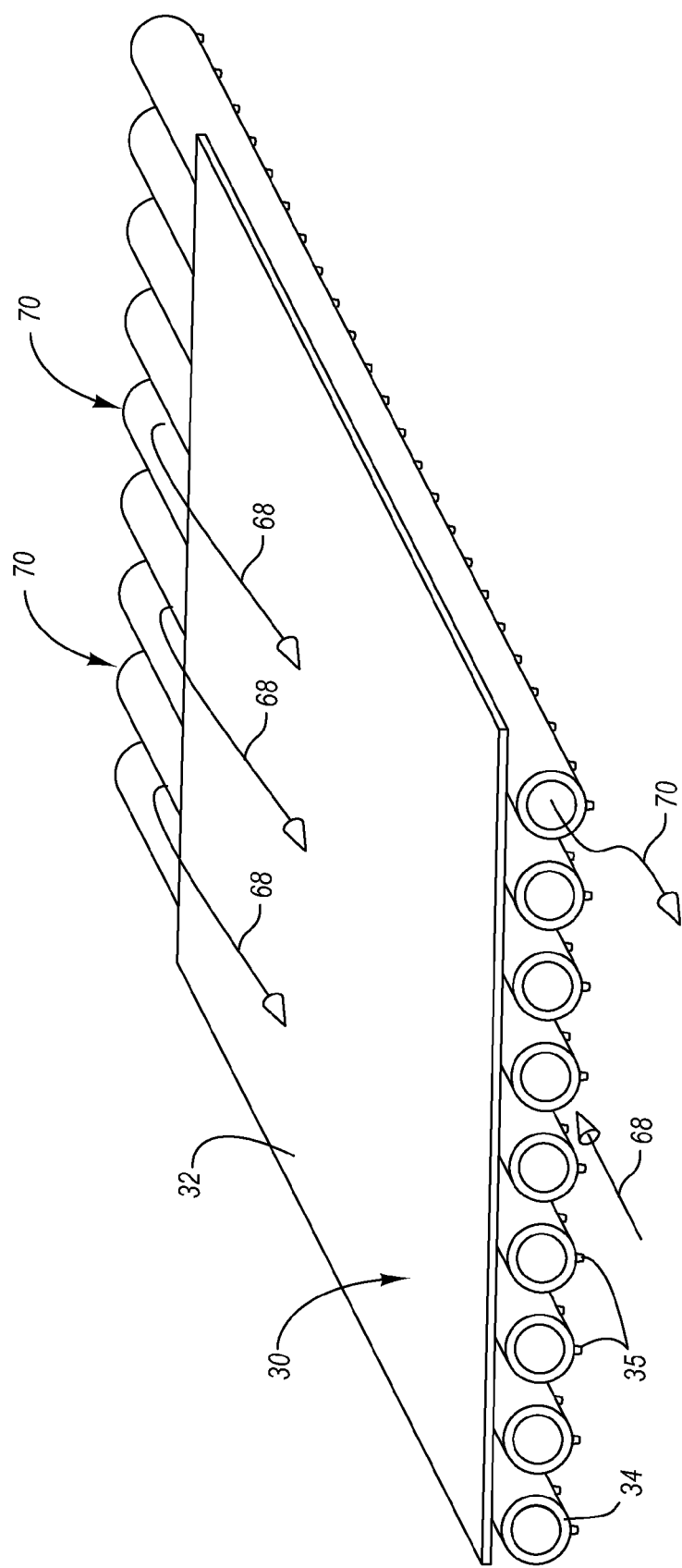
FIG. 6 is a perspective view of a condenser plate of the invention formed by a plate in contact with water filled tubes.
Figure 7:
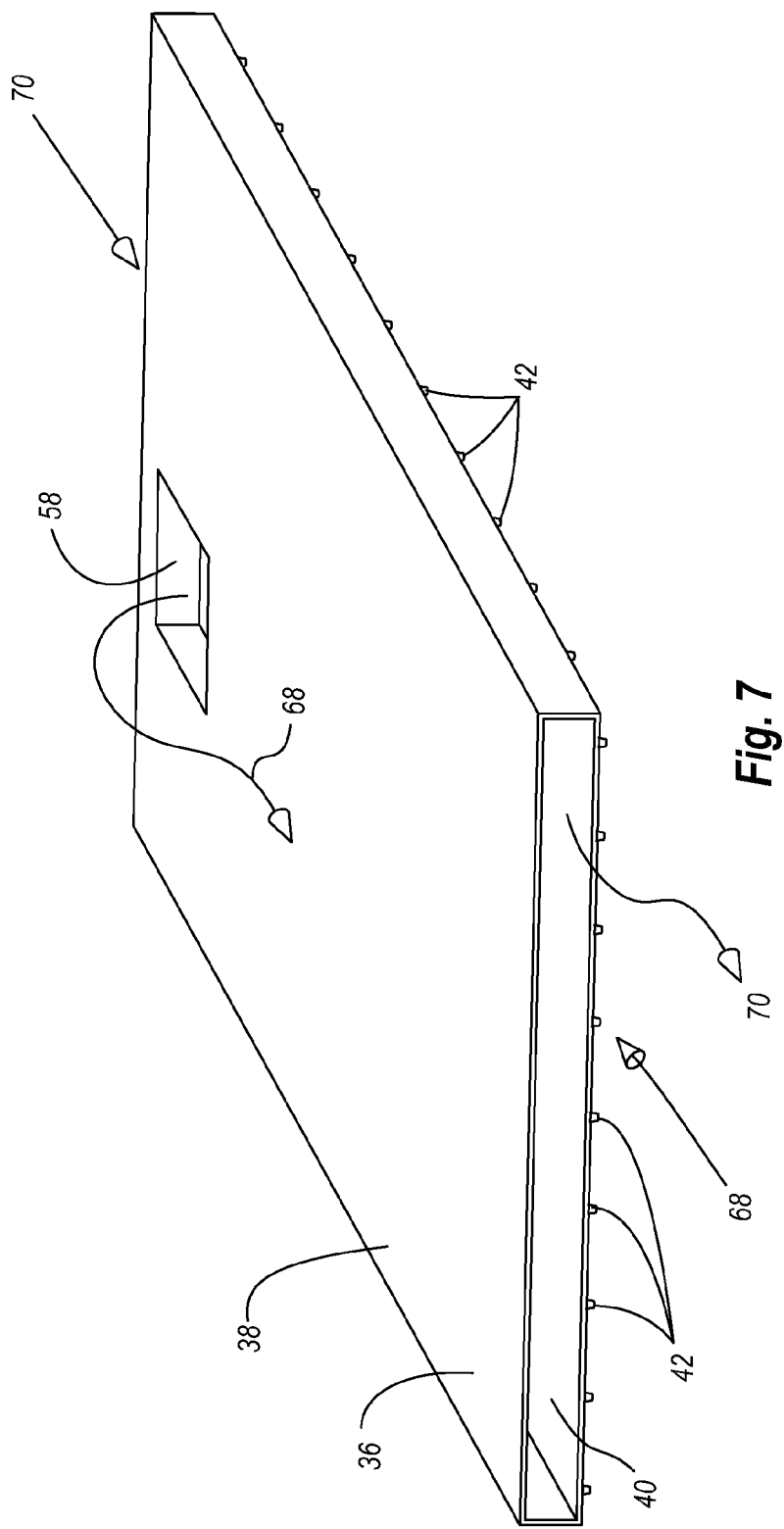
FIG. 7 is a perspective view of a condenser plate of the invention showing a condenser plate which serves as a channel for cooling water.

Referring now to FIGS. 5, 6, and 7, a condensation system 22 is utilized to cause oil carried within the vapor stream vented through the ventilation system from the chamber to condense into a liquid. The condensation system 22 includes a condenser 50 containing therein a plurality of spaced plates 30 and condensation tube. It is preferred that these condensation plates 30 be generally vertically spaced apart and oriented with a pitch (preferably 5-15°) for allowing condensate to cascade off of the top surfaces of the plates onto the plate 30 or surface below. The purpose of these plates is to direct gas flow across the adjacent plates 30 or pipes 34 and their protrusions 35, as well as to channel oil downwards to lower plates 30 and/or the bottom of the condenser.

It is preferred that the pipes 34 be cooled by liquid flowing through them, with the resulting cool surface assisting in the condensation step. An evaporative cooler/chiller/radiator/cooling tower/etc. is used to cool the water circulated through the pipes. A first bulkhead (header) 52 connects all of the first ends of the pipes 34 shown in FIG. 6 together and a second bulkhead 56 connects all of the second ends of the pipes 34 together. It is preferred that the water be pumped, through use of a pump, from the lower end to the upper end of the pitched plates.

It is further preferred that the plates have an alternating air passageway defined through the lower and upper ends of the plates thereby forming a zigzag air passage through the condenser through which the vapors flow. By creating such a conduit or passage, the time of airflow/vapor-flow across cooled plate surfaces is increased while keeping the size of the condenser smaller.

In a first embodiment of plates (FIG. 6) the plates 30 have a top side and a bottom side, with a plurality of condensation pipes 34 attached to or located adjacent to the bottom side of the plates. The preferred plates comprise a sheet 32 (preferably of sheet metal) to which the condensation pipes 34 are welded. The preferred pipes are dark iron pipes, stainless steel, copper pipes, etc. The preferred pitch or slope of the plates is 5-15°. A plurality of protrusions/knobs/ridges/projections/drip points/dimples/etc. ("protrusions") 35 preferably extend off the lowermost portion of the condensation pipes. These protrusions increase the surface area of the pipes and provide a location for oil to condense upon. In the preferred embodiment, these protrusions are located one-inch apart.

In a second embodiment of plate (FIG. 7), the plates 36 comprise a top plate 38, a bottom plate, and a pair of side plates forming a generally elongated rectangular tube 40 with an open first end and an open second end thereby defining a passageway through the tube 40. The preferred pitch or slope of the plates is 5-15°. A sealed cutout 58 is provided through the tube 40, for allowing gas to flow upwards through the plates and for collected oil to pass downwards to the lower plates and condenser bottom. The ends of the tubes 40 are sealed to a header 52 and 56 connecting to the water cooling system which cools the plates by circulation through the tubes 34 or tubes 40. A plurality of protrusions 42 are added to the bottom surface of the plate to increase the surface area of the bottom of the plate and provide a location for condensation to take place, as the protrusions 35 of FIG. 6.

Oil that condenses on the pipes 34 or tubes 40 and their protrusions 35 or 42 drips onto the plate (or surface) below them. The plates are positioned at a pitch (preferably ~5-15°) relative to horizontal so that the oil runs downwards to either drop off that plate onto the plate that is oriented below it, or, in the case of the lowermost plate, onto the bottom of the condenser and out the condenser tube 54. Oil collects on the bottom of the condenser, exits the condenser and is then carried (or pumped) by a suitable conduit to an oil storage vessel (not shown).

Figure 8:
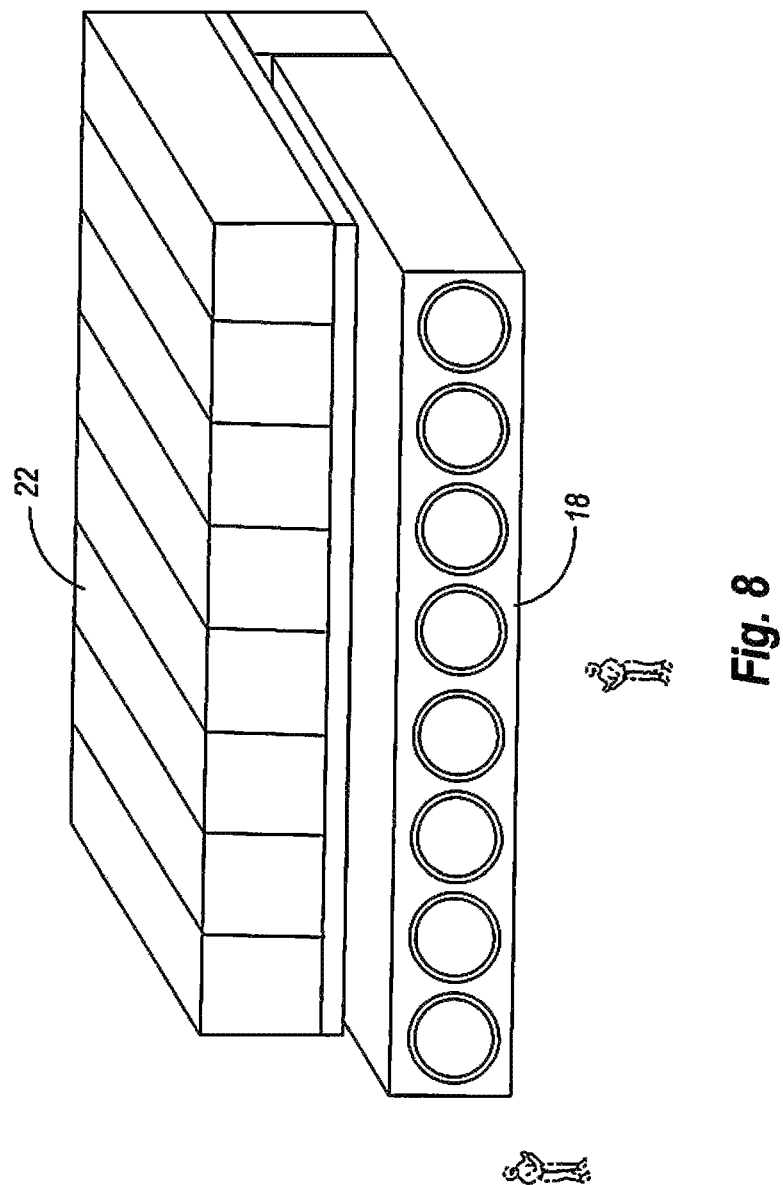
FIG. 8 is a perspective view of a large scale facility.

FIG. 8 shows a large scale implementation of the invention, with the condensations systems 22 shown above a row of pyrolysis chambers 18.

The oil recaptured through the present invention's method is the equivalent in chemical content to Number 6 cutting oil and comprises naphthas, diesel fuel, gasoline and other hydrocarbons. This recaptured oil 26 could be used directly as fuel for ships or could be refined to produce additional petroleum products. The ash resulting from the invention is an excellent feed stock, for steel mills, for charge carbon, or for other purposes. A carbon product containing about 2% of oil is one product produced in the method that is especially desirable, as the residual oil aids in combustion of the carbon product. Any steel that is recovered with the ash, would then be recycled as scrap steel. The method thus completely recycles the tires, has no emissions and results in no waste by-products to be disposed of in a landfill.

After the oil laden vapor is passed across the condenser 50, also called a condenser and the oil is condensed from the gaseous byproducts of pyrolysis, a gas remains. This gas 28 is collected and compressed in canisters. This collected gas is clean enough to be added to a natural gas system, and optionally can be used as a fuel source for heating subsequent pyrolysis chambers, and results in a net gain in energy within the system, plus accomplishes the goal of reducing the volume of waste tires.

It is preferred that the ventilation system 20 output from the pyrolysis chamber 18 connects to the bottom portion of the condenser 50 and that a secondary ventilation system 24 exist at the upper portion of the condenser. Vapor passing through the condensation system would thus enter at the bottom portion, pass through the zigzag air passage(s) defined between a plurality of plates (with oil condensing out of the vapor) and ultimately be vented out the secondary ventilation system at the upper portion of the condenser. The resulting gas can include natural gas, ethane, propane, butane and other hydrocarbons.

The present invention could comprise a physical (brick and mortar) structure whereby used tires are transported to it, or could even comprise one or more mobile units able to be transported to a location having a supply of used tires that need to be processed/recycled/disposed of.

The energy recovery process of the invention incorporates a pyrolysis chamber and condenser to extract hydro-carbons and moisture from tires, and condensing into fuel oil and natural gas. Preferably a high durometer/vulcanized tire is placed inside an oxygen free or low oxygen container. This container is heated on the exterior, thus heating the inside core and releasing the hydro-carbons, moisture, light and heavy napthas, and other chemicals into a gaseous state. This gas is transferred to the condenser where fuel oil and a form of natural gas are separated into their respective containers. Typical returns of fuel oil in relation to the specific weight of tire is dependent on the quality of material being fed into the process. 50% return of the weight of raw material being fed into the system is normal, i.e. 100 lbs. of raw material yield 50 lbs. of fuel oil. Scrap tires are typically used as raw materials due to the abundance of the tires.

Any high durometer/vulcanized rubber will serve as raw material in this process. The fuel oil is composed primarily of light and of the fuel and a variety of chemicals which is discussed later. The use of the fuel oil is primarily as a supplement to #6 cutting oil, crude diesel, and kerosene in kiln operations. The fuel oils is an excellent feed stock to be cracked and separated into its basic components. The natural gas that is separated in the process is similar to commercial natural gas. The BTU value is 1280 awe and 1303 dry. The properties of the natural gas is largely natural gas, ethane, propane, and butane. The natural gas is an excellent source to compress and store for use in lieu of natural gas.

The following invention and description is known as the Energy recovery process of the invention. The process will work on other forms of high durometer/vulcanized material. The abundance of scrap tires facilitates their use in this process. The pyrolysis chamber is filled with whole, baled, or chopped/shredded tires. The pyrolysis chamber is sealed from outside oxygen. The process requires an oxygen free or low oxygen burning or dehydration of the tire material. Heat is applied to pyrolysis chamber with the tire material inside. The outside temperature of Pyrolysis chamber is typically driven to 900 degrees Fahrenheit. Although a wide range of temperatures exists in this process, the results and return rates which are stated later is derived form 900 degree Fahrenheit temperature setting. The inside or "core temperature" of EC 1 (enclosed container 1) will slowly follow the outside skin temperature. Because the tires are a fuel and have a specific BTU value themselves, the core temperature will normally peak at approximately 10 degrees Fahrenheit above the outside skin temperature of the pyrolysis chamber When the core temperature of the pyrolysis chamber is raised, the moisture and chemicals in the tire compounds are released. The released material is in a gaseous state. The gas at this point contains heavy hydro-carbons and a combination of various flammable gas components. The gas resides in the pyrolysis chamber and is transported through a line into a closed container. The separation consists of fuel oil and natural gas, the fuel oil is comprised of light and heavy naphthas, diesel fuel, gasoline, and a variety of chemicals which is state later. The fuel oil has a specific weight of 7.56 lbs. per gallon. The fuel oil is very similar in properties to a sweet crude #6 cutting oil. The fuel oil has a BTU value of 17,700 BTU per pound. The following is a specific chemical breakdown and relative percentages of the API fuel oil:

| | |
|---|---|
| 1-Propene, 2-Methyl | 1.10% |
| Butane, 2-Methyl | 0.12% |
| 1,3-Pelltadiene | 1.73% |
| Cyclopropane, 1,2-Dimethy1-, Cis | 1.45% |
| 1,3-Cyclopentadiene | 0.12% |
| Cyclopentene | 0.42% |
| 2-Pentene, 2-Methyl | 0.37% |
| 1-Hexene | 0.43% |
| Hexane | 0.22% |
| Cyclopentene, 3-Methyl | 0.84% |
| 2-Pentene, 3-Methyl-, (E) | 0.39% |
| Cyclopentane, Methyl | 0.16% |
| 1,3-Cyclopelltadielle, Methyl | 1.00% |
| Benzene | 4.00% |
| 1,3,5-Hexatriene | 0.13% |
| Cyclohexene | 0.33% |
| Cyclopentane, l,2-Dimethyl-, Trans | 0.74% |
| 1.4-Hexadien, 4-Methyl- | 1.30% |
| Cyclopentene, 4,4-Demethyl- | 0.91% |
| Cyclohexane, Methyl- | 0.27% |
| Trans-3, 4,4-Trimethyl-2-Pentene | 0.28% |
| 1,3,5-Hexatriene, 3-Methyl- | 0.71% |
| 1,3,5-Hexatriene, 3-Methyl- | 0.23% |
| Toluene - | 11.95% |
| Cyclohexene, 1-Methyl | 0.47% |
| Pentane, 2,2,4,4-Tetramethyl | 0.44% |
| Cyclohexane, 1,3-Dimenthyl-trans- | 0.19% |
| 1-Heptene, 2-Methyl- | 0.13% |
| 1-Octene | 0.33% |
| 2,4-Hexadiene, 2,5-Demethyl | 0.21% |
| Cyclohexanne, 1,2-Dimethyl-, Cis- | 0.71% |
| 1,3-Hexadiene, 2,5-Dimenthyl- | 0.59% |
| Trans-3,7-Dimethylocyclohexene | 0.59% |
| Cyclohexene, 4-Ethenyl- | 0.40% |
| Bicyclo[6.1.0]Non-1-Ene | 0.20% |
| 2-Ethyl-3-Methycyclopentene | 0.34% |
| 1,3-Cyclopentandiene, Trimethyl- | 0.31% |
| Ethylbenzene | 5.64% |
| p-Xylene | 6.35% |
| Styrene | 1.39% |
| Benzene, 1,2-Dimethyl- | 1.61% |
| 3,4-Octadiene, 7-Methyl- | 0.15% |
| 1-Nonene | 0.12% |
| 1,5-hexadiene, 2,5-Dimethyl-3-Methylene- | 0.31% |
| Benzene, (l-Methylethyl)3- | 1.11% |
| Cyclohexene-1-Carboxaldehyde, 1-Methyl | 0.41% |
| Camphene | 0.14% |
| Benzene, 2-Propenyl- | 0.10% |
| Benzene, Propyl- | 1.14% |
| Benzene, 1-Ethyl-2-Methyl- | 4.83% |
| .alpha.-Methylstyrene | 1.47% |
| 1,2,4-Trimethylbenzene | 2.31% |
| Propane, 2-(2-Isopropylidene-33-Methyl eye1opropy1)-, Trans- | 0.31% |
| 2,6-0etadien-1-01, 3,7-Dimethyl-, (Z)- | 0.59% |
| Benzene, 1,2,3-Trirnethyl- | 0.30% |
| Benzene, 1-Methyl-2-(1-Methylethyl)- | 2.70% |
| Limonene | 6.96% |
| Thiophene, 2-Hexyl | 0.48% |
| Benzene, 1-Ethyl-3,5-Dimethyl-2- | 1.08% |
| Hexen-l-OL, (E)- | 0.26% |
| Benzene, l-Ethyl-2,4-Dimethyl- | 0.66% |
| Benzene, l-Metllyl-4-(1-Methylethenyl)- | 0.41% |
| Benzene, 1,2-Diethyl- | 0.24% |
| Bicyclo[3.1.0]Hexane, 6-Isopropylidene-l-Methyl- | 0.44% |
| Benzene, (1,l-Dimethylpropyl) | 0.53% |
| Benzene, 1,2,4,5-Tetramethyl- | 0.44% |
| Benzene, 2-Ethenyl-1,4-Dimethyl- | 0.12% |
| 1H-Indene, 2,3-Dihydro-4- | 0.81% |
| Methyl-Benzene, 1-Methyl-4-(2-Propenyl)- | 2.62% |
| Benzene, Pentyl | 0.39% |
| Naphthalene | 1.32% |
| 1H-Indene, 2,3-Dihydro-1,6-Dimethyl- | 0.57% |
| 1H-Indene, 2,3-Dihydro-1,2-Dimethyl- | 0.45% |
| 1,2-Benziaothiazole | 0.68% |
| Dodecane | 0.12% |
| Naphthalene, 1,2,3,4-Tetrahydro-2-Methyl- | 0.49% |
| Napthalene 1,2,3,4-Tetrahydor-6-Methyl- | 0.38% |
| 1H-Idene, 1,1-Demethyl- | 0.34% |
| 1H-Cyclopropa[b]Maphthalene,1a,2,7,7a-Tetrahydro- | 0.44% |
| Benzene, 1-Isothiocyanato-2-Methyl | 0.77% |
| Naphthalene, 2-Methyl | 0.75% |
| Naphthalene, 1-Methyl | 0.92% |
| Cyclooctene, 2-Methylene-6-(1-Propenylidene)- | 0.33% |
| 1H-Indene, 2,3-Dihydro-4,5,6-Trimethyl- | 0.20% |
| Benzene, 1,4-Bis(1-Mehtylethenyl)- | 1.61% |
| Naphthalene, 2-Ethyl | 0.24% |
| Naphthalene, 2,7-Dimethyl | 0.40% |
| Naphthalene, 1,3-Dimethyl | 1.46% |
| Quinoline, 2,6-Dimethyl- | 0.36% |
| Tridecane | 0.43% |
| Naphthalene, 2,3,6-Trimethyl- | 0.71% |
| Naphthalene, 1,4,6-Trimethyl | 0.31% |
| Naphthalene, 1,4,5-Trimethyl | 0.21% |
| Naphthalene, 1,1-(2-Propenyl) | 0.75% |
| Phenol, 2,4,6-Tribromo- | 2.58% |
| Heptadecane | 2.20% |
| Phenanthrene, 2,4,5,7-Tetramethyl | 0.33% |

The recovered oil is transferred from condenser through a transfer line into a storage tank. Another product that is separated in the condenser is the natural gas composition. The natural gas burns relatively similar to commercial natural gas. A large content of the natural gas is composed of properties similar to commercial natural gas. BTU values vary slightly but are normally 1,280 BTU wet and 1,303 dry. The captured natural gas in the raw state has a strong aromatic odor.

When the captured natural gas is collected and stored, it can be used in lieu of commercial grade natural gas. In the tire to oil operation approximately 600 cubic feet of natural gas is consumed per hour in high burn, and approximately 300 cubic feet of natural gas is consumed per hour on low burn. Low burn is sufficient to maintain temperature once the system temperature set-point has been reached. The tire to oil process produces approximately 1,400 cubic feet per hour of captured natural gas which is collected, compressed, and may be reused to fuel the process, or sold to be used as an energy product. The following description outlines the components of the captured natural gas:

| | |
|---|---|
| N Hexane | 2.146% |
| Propane | 13.955% |
| i-Butane | 2.767% |
| n-Butane | 1.497% |
| i-pentane | 0.271% |
| n-pentane | 1.081% |
| carbon Dioxide | 15.480% |
| ethane | 11.987% |
| oxygen | 1.844% |
| nitrogen | 7.921% |
| Natural gas | 41.051% |

The captured natural gas is transferred from the condenser through lines to a storage tank.

The natural gas is transferred from the pyrolysis chamber through a line into a collection tank which serves as the collection and storage point for the natural gas. The residual mass left in the pyrolysis chamber is carbon and steel. After the process is completely finished, the carbon contain 75% carbon and 25% ash. The steel is a high carbon steel which is magnetic, and thus easily separable. All components of the process are salable in one form or another. The fuel oil is sold as sweet petroleum crude, the carbon is sold as a coarse carbon, the natural gas is used in the process in lieu of commercial nature gas, and the steel is sold as scrap steel.

Still other features and advantages of the present invention will become readily apparent to those skilled in this art from the following detailed description describing preferred embodiments of the invention, simply by way of illustration of the best mode contemplated by carrying out my invention. As will be realized, the invention is capable of modification in various obvious respects all without departing from the invention. Accordingly, the drawings and description of the preferred embodiments are to be regarded as illustrative in nature, and not as restrictive in nature.

While the invention is susceptible of various modifications and alternative constructions, certain illustrated embodiments thereof have been shown in the drawings and will be described below in detail. It should be understood, however, that there is no intention to limit the invention to the specific form disclosed, but, on the contrary, the invention is to cover all modifications, alternative constructions, and equivalents falling within the spirit and scope of the invention as defined in the claims.

In this description and in the figures, like elements are identified with like reference numerals. The use of "or" indicates a non-exclusive alternative without limitation unless otherwise noted. The use of "including" means "including, but not limited to," unless otherwise noted.

While there is shown and described the present preferred embodiment of the invention, it is to be distinctly understood that this invention is not limited thereto, but may be variously embodied to practice within the scope of the following claims. From the foregoing description, it will be apparent that various changes may be made without departing from the spirit and scope of the invention as defined by the following claims.

What is claimed is:

1. A method of recovering oil from tires, comprising:
providing a supply of automobile tires;
axially aligning a quantity of said tires so that they form a cylinder made of a plurality of tires;
compressing said bundle and banding said bundle in its compressed state through use of at least one metal strap, to form a bundle of said axially aligned tires;
placing one or more bundles in a receptacle;
placing one or more receptacles in a pyrolysis chamber;
sealing said pyrolysis chamber;
heating said pyrolysis chamber, receptacle and bundle to a temperature of 500-1300° F. (260-704° C.), thereby charring said bundle and releasing a vapor;
ventilating said vapor from said pyrolysis chamber into a condensation system comprising a plurality of condensation plates which define a circuitous exit pathway for gaseous vapors produced from said pyrolysis chamber and which also define an oil drainage pathway to a condensation tube, through use of a ventilation system;
condensing oil from said vapor in said condensation system;
collecting said oil;
compressing and storing said remaining vapor, with the system resulting in up to 50% oil recovery by weight and a net positive energy production of natural gas cooling the pyrolysis chamber, receptacle and bundle after heating to about 150° F.;
removing the charred remnants of the bundle from the receptacle; and
separating the charred remnants of the bundle into carbon and metal.

2. The method of claim 1 which further includes providing said condensation chamber with water cooled condensation plates set at an angle from horizontal, defining a circuitous exit pathway for gaseous vapors produced from said pyrolysis chamber and which also define an oil drainage pathway to a condensation tube.

3. The method of claim 2 which further includes providing said condensation chamber with water cooled condensation plates with a plurality of condensation points to facilitate condensation and dripping of oil from said gaseous vapors from said pyrolysis chamber.

4. The method of claim 3 which further includes providing a collection and compression system for gasses which exit the condenser, and which still contain hydrocarbons.

* * * * *